United States Patent
Mun et al.

(10) Patent No.: US 10,753,800 B2
(45) Date of Patent: Aug. 25, 2020

(54) CALIBRATOR OF AN OPTICAL EMISSION SPECTROSCOPY

(71) Applicant: Samsung Electronics Co., Ltd., Suwon-si, Gyeonggi-do (KR)

(72) Inventors: Jeong-Il Mun, Hwaseong-si (KR); Hyung-Joo Lee, Hwaseong-si (KR); Jong-Woo Sun, Hwaseong-si (KR); Ja-Myung Gu, Cheonan-si (KR); Jae-Woong Hwang, Goyang-si (KR); Jong-Hwan An, Yongin-si (KR)

(73) Assignees: Samsung Electronics Co., Ltd., Gyeonggi-do (KR); Semes Co., Ltd., Chungcheongnam-do (KR)

( * ) Notice: Subject to any disclaimer, the term of this patent is extended or adjusted under 35 U.S.C. 154(b) by 0 days.

(21) Appl. No.: 16/238,644

(22) Filed: Jan. 3, 2019

(65) Prior Publication Data

US 2019/0301937 A1    Oct. 3, 2019

(30) Foreign Application Priority Data

Mar. 28, 2018    (KR) .......................... 10-2018-0035700

(51) Int. Cl.
*G01J 3/30* (2006.01)
*G01J 3/443* (2006.01)
(Continued)

(52) U.S. Cl.
CPC .............. *G01J 3/443* (2013.01); *G01N 21/73* (2013.01); *G01J 3/0297* (2013.01);
(Continued)

(58) Field of Classification Search
CPC .. G01J 3/443; G01J 3/0297; G01J 2003/4435; G01N 21/62; G01N 21/73;
(Continued)

(56) References Cited

U.S. PATENT DOCUMENTS 6,077,386 A    6/2000 Smith, Jr. et al.
7,439,534 B2    10/2008 Kaihori
(Continued)

FOREIGN PATENT DOCUMENTS

| KR | 10-1279911 | 2/2010 |
|----|-----------|--------|
| KR | 10-2015-0032987 A | 4/2015 |
| KR | 10-1619834 B1 | 5/2016 |

OTHER PUBLICATIONS

Korean Office Action dated Mar. 15, 2019 issued in corresponding Korean Application No. 10-2018-0035700.

*Primary Examiner* — Tarifur R Chowdhury
*Assistant Examiner* — Jonathon Cook
(74) *Attorney, Agent, or Firm* — Harness, Dickey & Pierce, P.L.C.

(57) ABSTRACT

A calibrator of an OES may include a cover, a reference light source and a controller. The cover may be detachably combined with a ceiling of a plasma chamber of a plasma processing apparatus. The reference light source may be installed at the cover to irradiate a reference light to the OES through an inner space of the plasma chamber. The controller may compare a spectrum of the reference light inputted into the OES with a spectrum of an actual light inputted into the OES during a plasma process in the plasma chamber to calibrate the OES. Thus, the OES may be calibrated without disassembling of the OES from the plasma chamber to decrease a time for calibrating the OES.

20 Claims, 7 Drawing Sheets

(51) Int. Cl.
   *G01N 21/73* (2006.01)
   *G01J 3/02* (2006.01)
(52) U.S. Cl.
   CPC . *G01N 2201/068* (2013.01); *G01N 2201/127* (2013.01); *G01N 2201/13* (2013.01)
(58) Field of Classification Search
   CPC ....... G01N 2201/068; G01N 2201/127; G01N 2201/13
   See application file for complete search history.

(56) References Cited

U.S. PATENT DOCUMENTS

| | | |
|---|---|---|
| 7,734,439 B2 | 6/2010 | Timans |
| 8,125,633 B2 | 2/2012 | Whelan et al. |
| 8,358,416 B2 | 1/2013 | Venugopal et al. |
| 2009/0030632 A1* | 1/2009 | Tallavarjula ......... G01N 21/274 702/85 |
| 2013/0016343 A1 | 1/2013 | Corless et al. |
| 2016/0177449 A1 | 6/2016 | Ohmori et al. |
| 2018/0136118 A1* | 5/2018 | Kueny ................... G01N 21/73 |

* cited by examiner

CALIBRATOR OF AN OPTICAL EMISSION SPECTROSCOPY

CROSS-RELATED APPLICATION

This application claims priority under 35 USC § 119 to Korean Patent Application No. 2018-0035700, filed on Mar. 28, 2018 in the Korean Intellectual Property Office (KIPO), the contents of which are herein incorporated by reference in their entirety.

BACKGROUND

Example embodiments relate to a calibrator of an optical emission spectroscopy. More particularly, example embodiments relate to a calibrator for calibrating an optical emission spectroscopy that may diagnose plasma state in a plasma chamber.

Generally, a layer may be formed on a semiconductor substrate, and/or a layer on a semiconductor substrate may be etched or cleaned/ashed, using plasma in a plasma chamber of a plasma processing apparatus. Conditions for forming and/or etching and/or cleaning the layer may be determined in accordance with plasma state. Thus, in order to improve productivity of semiconductor devices, the plasma state may be diagnosed using an optical emission spectroscopy (OES). However, an error in the OES may result in inaccurate diagnosis of the plasma state. Thus, calibration of the OES may be required.

After dissembling the OES from the plasma chamber, a reference light may be irradiated to the OES. A spectrum of the reference light may be compared with a spectrum of an actual light inputted into the OES in a plasma process to calibrate the OES.

This calibration of the OES may be possible by disassembling the OES from the plasma chamber, and by transferring the dissembled OES to a calibration apparatus including a reference light source. Further, after calibrating the OES, the OES may be reassembled with the plasma chamber. As a result, a time for calibrating the OES may be long. Furthermore, the OES may be contaminated during the transfer of the OES during calibration.

SUMMARY

Example embodiments provide a calibrator of an optical emission spectroscopy (OES) that may be capable of calibrating the OES in a plasma processing apparatus.

According to some example embodiments, there may be provided a calibrator of an OES. The calibrator may include includes a cover configured to be detachably combined with a ceiling of a plasma chamber, a reference light source at the cover, the reference light source configured to irradiate a reference light to the OES through the plasma chamber, and a controller configured to calibrate the OES by comparing a spectrum of the reference light incident to the OES with a spectrum of an actual light incident to the OES during a plasma process performed in the plasma chamber.

According to some example embodiments, there may be provided a calibrator of an OES. The calibrator may include a cover configured to be attached and detached with a ceiling of a plasma chamber, a reference light source at the cover, the reference light source configured to irradiate a reference light to the OES through the plasma chamber, a mirror under the cover, the mirror slanted with respect to a vertical direction, the mirror configured to reflect the reference light incident to the plasma chamber in the vertical direction toward a viewport, the viewpoint being at a sidewall of the plasma chamber, a diffuser configured to diffuse the reference light reflected from the mirror, a collimator configured to induce the reference light diffused by the diffuser in a horizontal direction, and a controller configured to calibrate the OES by comparing a spectrum of the reference light incident to the OES through the collimator with a spectrum of an actual light incident to the OES during a plasma process performed in the plasma chamber.

According to some example embodiments, there may be provided a calibrator of an OES. The calibrator may include a cover configured to be detached and attached with a ceiling of a plasma chamber, a reference light source at the cover, the reference light source configured to irradiate a reference light to the OES through the plasma chamber, a mirror under the cover, the mirror slanted with respect to a vertical direction, the mirror configured to reflect the reference light incident to the plasma chamber in the vertical direction toward a viewport located at a sidewall of the plasma chamber, a diffuser configured to diffuse the reference light reflected from the mirror toward the viewport, a lens configured to concentrate the reference light diffused by the diffuser, and a controller configured to calibrate the OES by comparing a spectrum of the reference light incident to the OES through the lens with a spectrum of an actual light incident to the OES during a plasma process performed in the plasma chamber.

According to some example embodiments, after the plasma process, the cover with the reference light source may be assembled with the ceiling of the plasma chamber. The reference light source may irradiate the reference light to the OES through the viewport. The controller may compare the spectrum of the reference light inputted into the OES with the spectrum of the actual light inputted into the OES in the plasma process to calibrate the OES. Thus, the OES may be calibrated without disassembling of the OES from the plasma chamber to decrease a time for calibrating the OES. Further, because it may not be required to transfer the OES, the OES may not be contaminated.

BRIEF DESCRIPTION OF THE DRAWINGS

Example embodiments will be more clearly understood from the following detailed description taken in conjunction with the accompanying drawings.

FIG. 1 is an exploded perspective view illustrating a calibrator of an OES in accordance with some example embodiments;

FIG. 2 is a cross-sectional view illustrating the calibrator in FIG. 2 assembled with a plasma chamber of a plasma processing apparatus;

FIG. 3 is an enlarged cross-sectional view illustrating a mirror of the calibrator in FIG. 2;

FIG. 4 is a cross-sectional view illustrating a calibrator of an OES in accordance with some example embodiments;

FIG. 5 is an exploded perspective view illustrating a calibrator of an OES in accordance with some example embodiments;

FIG. 6 is a cross-sectional view illustrating the calibrator in FIG. 5 assembled with a plasma chamber of a plasma processing apparatus;

FIG. 7 is an exploded perspective view illustrating a calibrator of an OES in accordance with some example embodiments; and FIG. 8 is a cross-sectional view illustrating the calibrator in FIG. 7 assembled with a plasma chamber of a plasma processing apparatus.

DETAILED DESCRIPTION

Hereinafter, example embodiments will be explained in detail with reference to the accompanying drawings.

Figure 1:
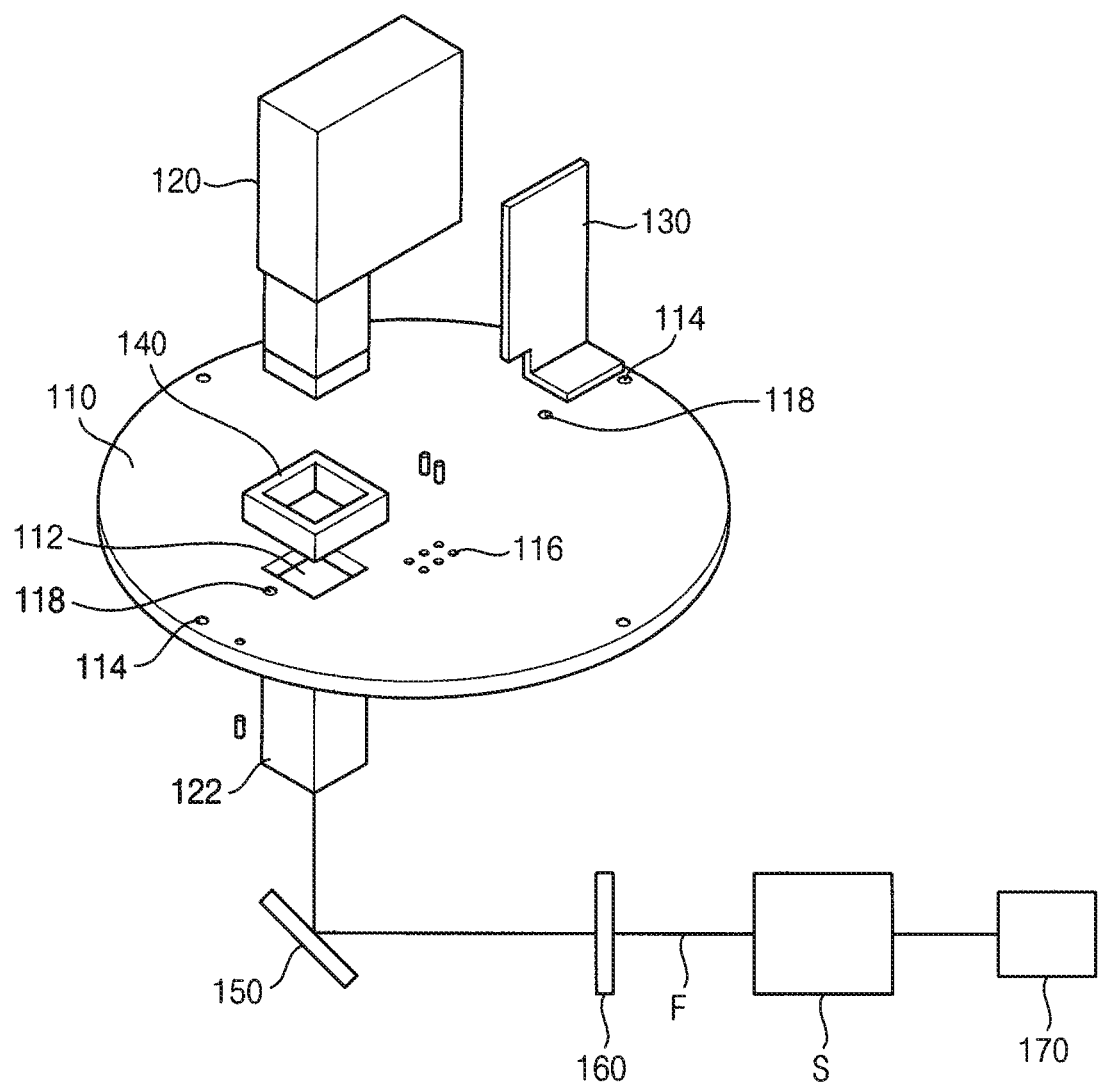
FIGS. 1 to 8 represent non-limiting, example embodiments as described herein.
Figure 2:
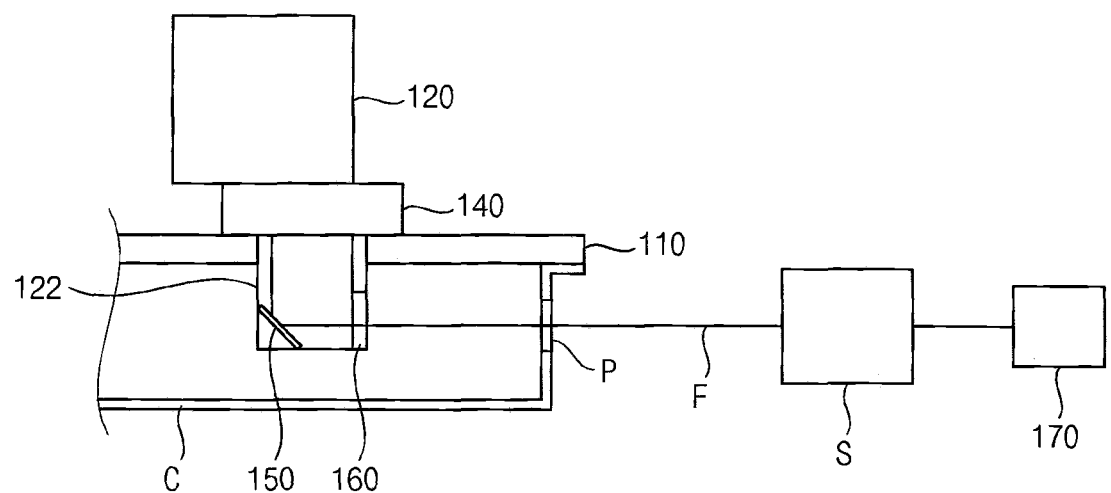
Figure 3:
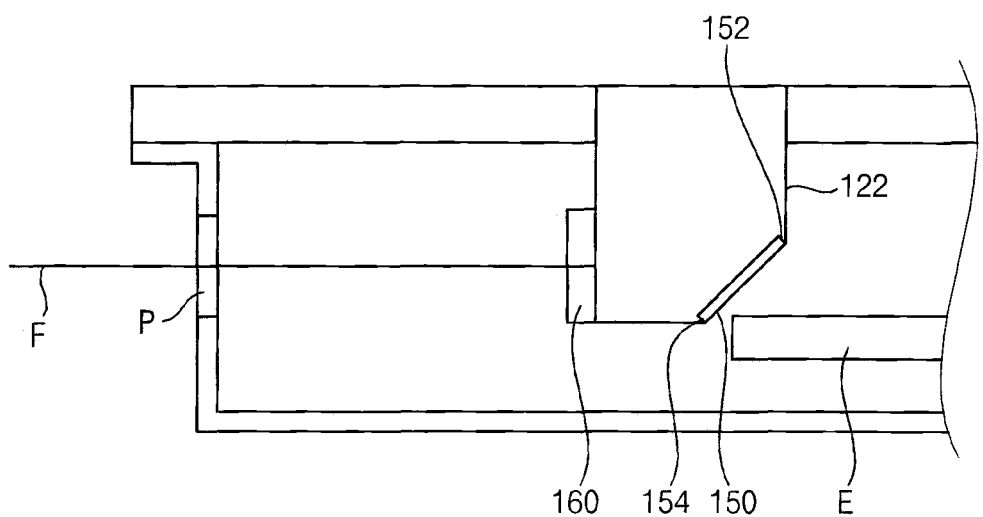

FIG. 1 is an exploded perspective view illustrating a calibrator of an OES in accordance with some example embodiments, FIG. 2 is a cross-sectional view illustrating the calibrator in FIG. 2 assembled with a plasma chamber of a plasma processing apparatus, and FIG. 3 is an enlarged cross-sectional view illustrating a mirror of the calibrator in FIG. 2.

Referring to FIGS. 1 to 3, a calibrator of an optical emission spectroscopy (OES) in accordance with some example embodiments may include a cover 110, a reference light source 120, a cover bracket 130, a light source bracket 140, a mirror 150, a diffuser 160 and a controller 170.

The OES S may receive light, e.g., actual light emitted from plasma, which may be generated in a plasma chamber C. The OES S may receive the light through an optical fiber F. The actual light may be transmitted to the OES S through a viewport P installed at a sidewall of the plasma chamber C. The optical fiber F may be connected between the viewport P and the OES S.

The cover 110 may be detachably combined with a ceiling of the plasma chamber C. A lid (not shown) may cover the ceiling of the plasma chamber C during a plasma process. Before and/or after performing the plasma process, e.g. after performing the plasma process a number of times, the lid may be disassembled from the plasma chamber C. The cover 110 in place of the lid may be combined with the ceiling of the plasma chamber C. Thus, the cover 110 may have a size for fully covering the ceiling of the plasma chamber C. Additionally and/or alternatively, in order to decrease noise influences, the cover 110 may have a black color for forming a darkroom in the plasma chamber C.

In some example embodiments, the cover 110 may have a circular plate shape substantially the same as that of the lid. The cover 110 may have at least two first pin holes 114. At least two pins, which may be formed at an upper ends of the plasma chamber C, may be inserted into the first pin holes 114, respectively. For example, the cover 110 may be assembled with the ceiling of the plasma chamber C by inserting the pins into the first pin holes 114. Further, the cover 110 may be disassembled from the ceiling of the plasma chamber C by pulling out the pins from the first pin holes 114. Therefore, the calibrator may have a portable structure readily applicable to various plasma chambers C that may perform a calibration operation. The various plasma chambers C may correspond to various models from various providers; inventive concepts may not be limited to a particular provider and/or a particular model of a plasma chamber C.

In some example embodiments, the first pin holes 114 may be positioned on a diameter line of the cover 110. For example, the first pin holes 114 may be arranged spaced apart from each other by a same gap with respect to a center point of the cover 110. Alternatively, the first pin holes 114 may include at least three holes spaced apart from each other by a same gap.

Alternatively or additionally, the cover 110 may further include at least two second pin holes 118. Because the plasma chambers C may have different sizes, the second pin holes 118 may be used for detachably combining the cover 110 with the plasma chambers C having the different sizes. The second pin holes 118 may be positioned inside the first pin holes 114 on the diameter line of the cover 110. Pins of another plasma chamber having a size smaller than that of the plasma chamber C may be inserted into the second pin holes 118. Further, the cover 110 may further include at least two third pin holes inside the second pin holes 118.

The cover 110 may have an optical hole 112 through which a reference light generated from the reference light source 120 may pass. In some example embodiments, the optical hole 112 may have a rectangular shape; however, inventive concepts may not be limited thereto.

The reference light source 120 may be arranged on an outer surface of the cover 110. Thus, the reference light source 120 may be positioned outside the plasma chamber C. The reference light source 120 may irradiate the reference light into the plasma chamber C, e.g. may irradiate the reference light into the plasma chamber in a vertical direction.

In some example embodiments, the reference light source 120 may be fixed to the outer surface of the cover 110 using the cover bracket 130. Bolts may be inserted into fixing holes 116 of the cover 110 to fix the reference light 120 to the cover 110. The cover bracket 130 may be arranged on a side surface of the reference light source 120.

An emitter of the reference light source 120 for emitting the reference light may be inserted into the optical hole 112 of the cover 110 using the light source bracket 140. The reference light source 120 may have been previously combined with the cover 110. Thus, when the pins may be inserted into the first pin holes 114, the cover 110 may be combined with the ceiling of the plasma chamber C to form a darkroom in the plasma chamber C. Simultaneously, the emitter of the reference light source 120 may be automatically and/or manually aligned in the vertical direction.

A body tube 122 may be extended from a lower end of the optical hole 112 into the plasma chamber C. The body tube 122 may guide the reference light from the reference light source 120 into the plasma chamber C in the vertical direction.

The mirror 150 may be arranged in the body tube 122 in a slanted direction, with respect to a vertical direction. The mirror 150 may reflect the reference light irradiated from the reference light source 120 into the plasma chamber C toward the viewport P. Because the viewport P may be arranged on the sidewall of the plasma chamber C, the mirror 150 may be inclined to the vertical direction at an angle of about 45°.

The diffuser 160 may be arranged between the mirror 150 and the viewport P. In order to decrease directions of the reference light reflected from the mirror 150, the diffuser 160 may diffuse the reference light toward the viewport P.

A space between the ceiling of the plasma chamber C, e.g., a lower surface of the cover 110 and an electrostatic chuck (ESC) E for supporting a substrate may have a low height. In order to coincide a center point of the diffuser 160 with a center point of the viewport P in the space having the low height, it may be required to reduce a size of the diffuser 160 caused by an interference between the mirror 150 and the ESC E. When the diffuser 160 may have a small size, the reference light may not have a specific, e.g. desired intensity due to an assembly tolerance of the diffuser 160.

Thus, the mirror 150 may have an upper end 152 positioned higher than the ESC E, and a lower end 154 positioned lower than the ESC E. The mirror 150 may not interfere with the ESC E. As a result, the diffuser 160 may have a large size so that the desired intensity may be provided to the reference light.

The controller 170 may compare a spectrum of the actual light incident to the OES S with a spectrum of the reference light. An intensity of the spectrum of the reference light may be stored in the controller 170, e.g., in memory associated with the controller 170. Thus, the controller 170 may obtain, e.g. calculate, a gain and an offset value in accordance with comparison results. The controller 170 may output OES data for calibrating the OES S from the gain and the offset value. The controller 170 may be implemented in hardware configured to execute software, that when executed by the hardware, causes the hardware to perform such functions. The hardware may be or may include a processor, such as a Central Processing Unit (CPU), and/or a Field Programmable Gate Array (FPGS). The functions may be stored on or transmitted over as one or more instructions or code on a tangible, non-transitory computer-readable medium. Software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Figure 4:
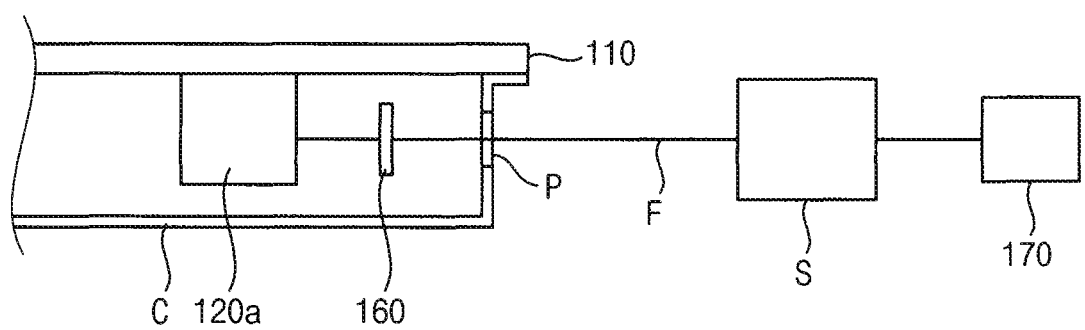

FIG. 4 is a cross-sectional view illustrating a calibrator of an OES in accordance with some example embodiments.

Referring to FIG. 4, a calibrator of an OES in accordance with some example embodiments may include a cover 110, a reference light source 120a, a diffuser 160 and a controller 170.

The cover 110 may have a structure substantially the same as that of the cover 110 in FIG. 1. Thus, any further illustrations with respect to the cover 110 may be omitted herein for brevity.

The reference light source 120a may be arranged on an inner surface of the cover 110. Thus, the reference light source 120a may be positioned in the plasma chamber C. The reference light source 120a may irradiate the reference light in a horizontal direction toward the diffuser 160 and the viewport P. Therefore, the calibrator may not include the mirror for reflecting the reference light.

The diffuser 160 may have a structure and a function substantially the same as those of the diffuser 160 in FIG. 1. Thus, any further illustrations with respect to the diffuser 160 may be omitted herein for brevity.

The controller 170 may have a function substantially the same as that of the controller 170 in FIG. 1. Thus, any further illustrations with respect to the controller 170 may be omitted herein for brevity.

Figure 5:
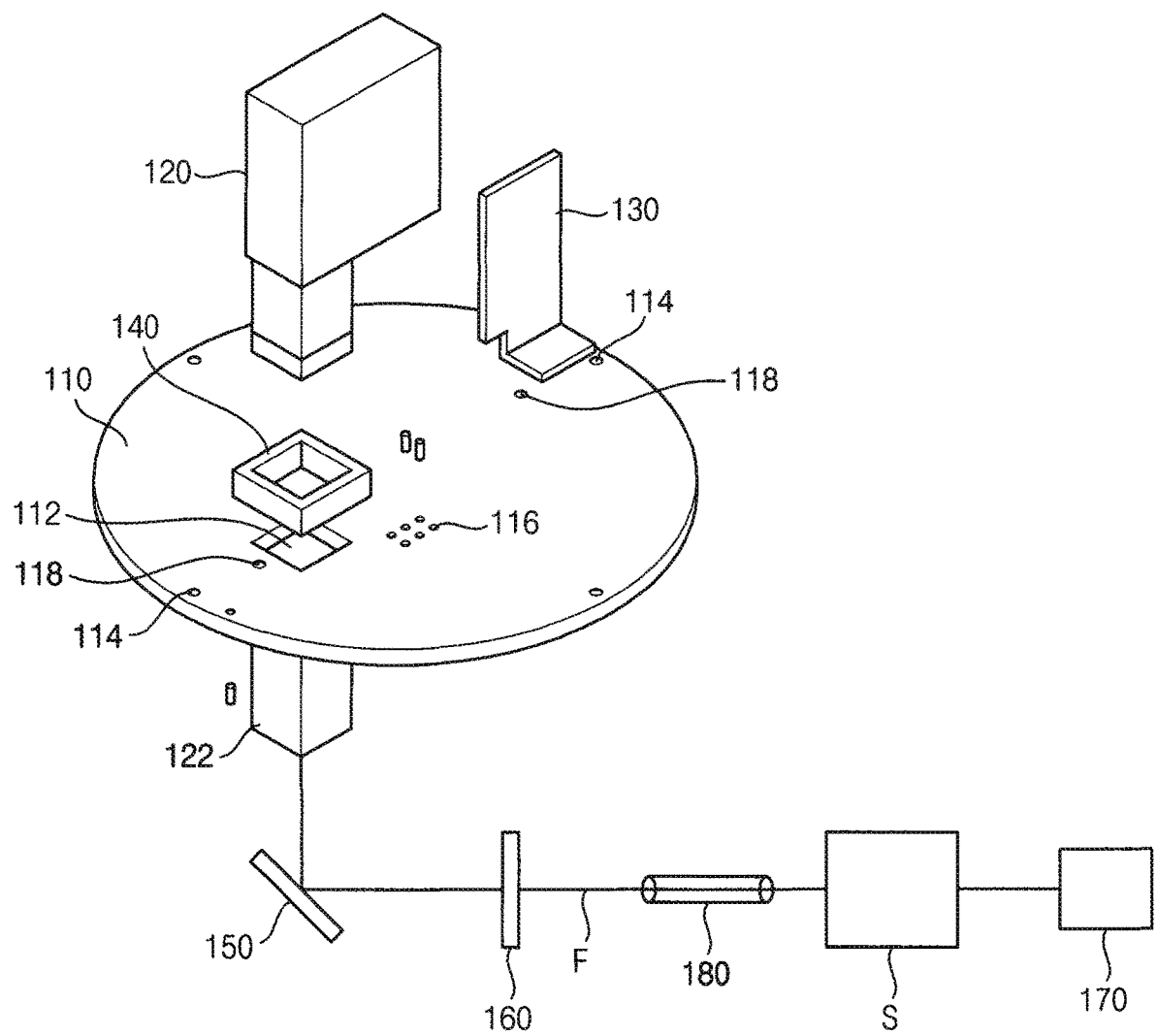
Figure 6:
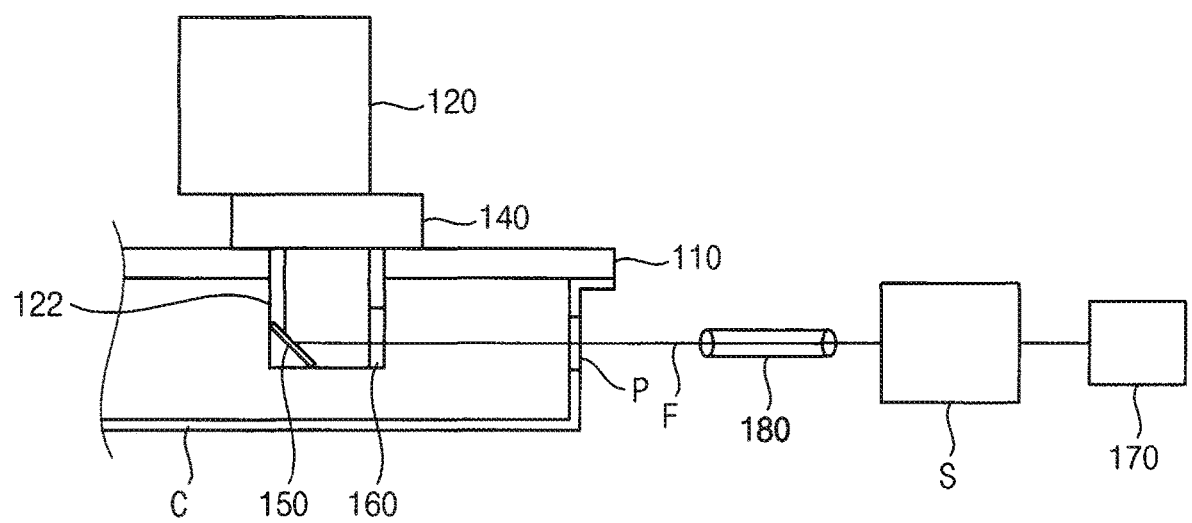

FIG. 5 is an exploded perspective view illustrating a calibrator of an OES in accordance with some example embodiments, and FIG. 6 is a cross-sectional view illustrating the calibrator in FIG. 5 assembled with a plasma chamber of a plasma processing apparatus.

A calibrator of an OES in accordance with this example embodiment may include elements substantially the same as those of the calibrator in FIG. 1 except for further including a collimator. Thus, the same reference numerals may refer to the same elements and any further illustrations with respect to the same elements may be omitted herein for brevity.

Referring to FIGS. 5 and 6, the calibrator may further include the collimator 180. The collimator 180 may be arranged between the diffuser 160 and the OES S. The collimator 180 may be positioned outside or inside the plasma chamber C.

The collimator 180 may induce the reference light diffused by the diffuser 160 along the horizontal direction. Particularly, the collimator 180 may induce a part of the reference light diffused by the diffuser 160 to the horizontal direction. Thus, the reference light may have uniformity improved by the collimator 180. As a result, the OES S may receive the part of the reference light having the improved uniformity by the collimator 180.

Figure 7:
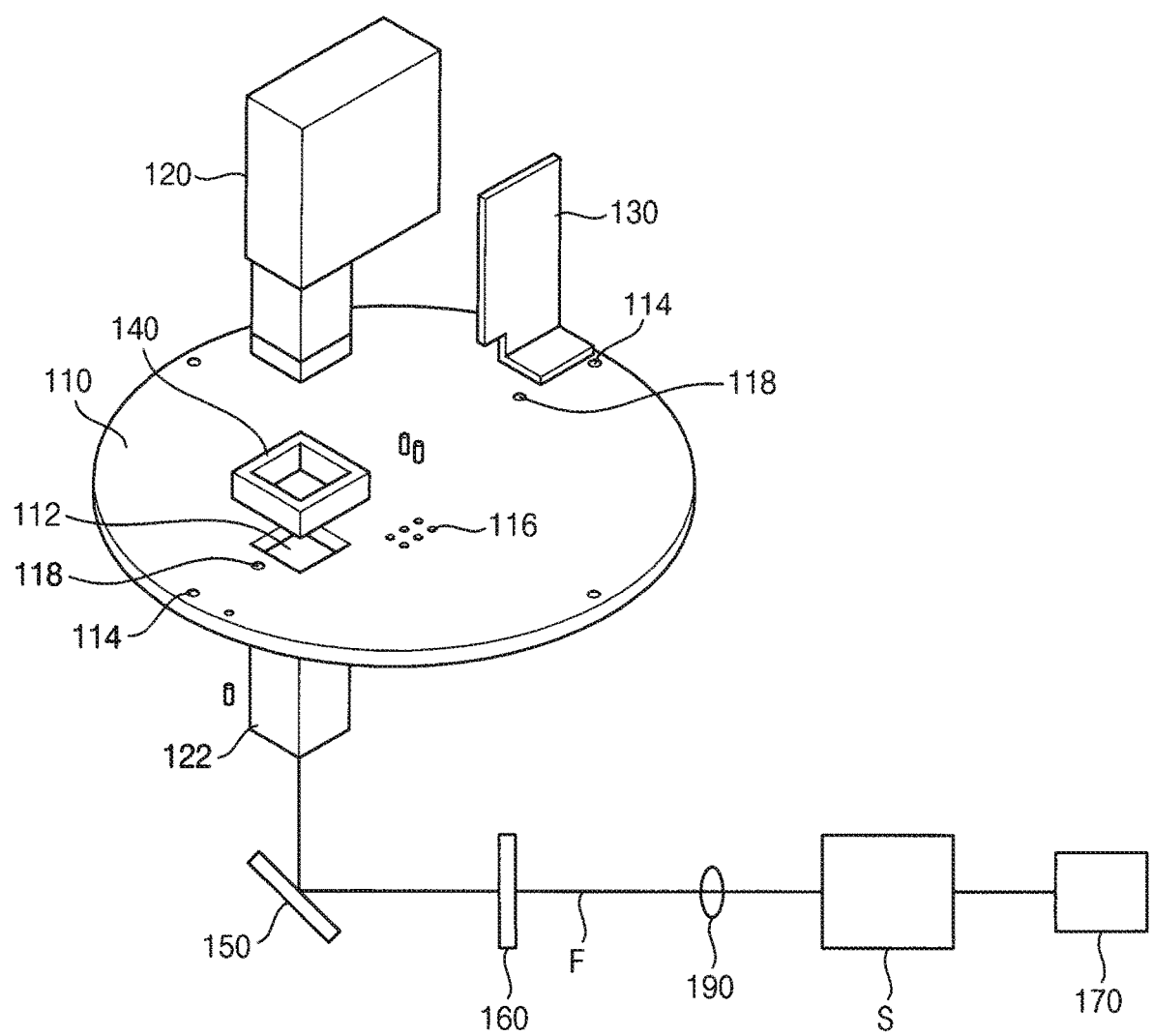
Figure 8:
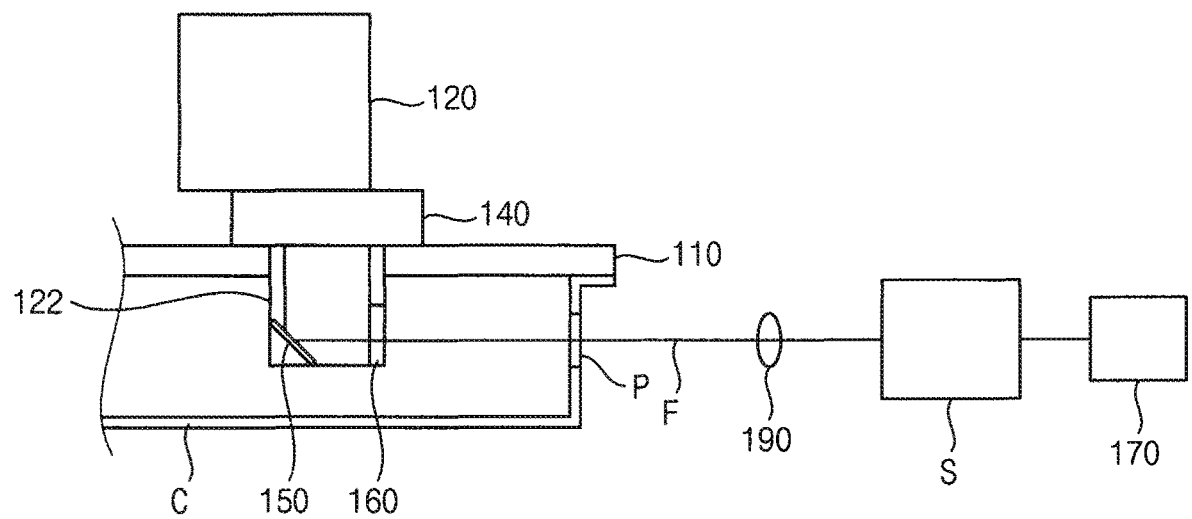

FIG. 7 is an exploded perspective view illustrating a calibrator of an OES in accordance with some example embodiments, and FIG. 8 is a cross-sectional view illustrating the calibrator in FIG. 7 assembled with a plasma chamber of a plasma processing apparatus.

A calibrator of an OES may include elements substantially the same as those of the calibrator in FIG. 1 except for further including a lens. Thus, the same reference numerals may refer to the same elements and any further illustrations with respect to the same elements may be omitted herein for brevity.

Referring to FIGS. 7 and 8, the calibrator of this example embodiment may further include the lens 190. The lens 190 may be arranged between the diffuser 160 and the OES S. The lens 190 may be positioned outside or inside the plasma chamber C.

The lens 190 may concentrate the reference light diffused by the diffuser 160. For example, the lens 190 may concentrate a part of the reference light diffused by the diffuser 160. Thus, the reference light may have improved uniformity by the lens 190. As a result, the OES S may receive the part of the reference light having the improved uniformity by the lens 190.

According to some example embodiments, after the plasma process, e.g. after some time has elapsed or after a particularly scheduled time, the cover with the reference light source may be assembled with the ceiling of the plasma chamber. The reference light source may irradiate the reference light to the OES through the viewport. The controller may compare the spectrum of the reference light inputted into the OES with the spectrum of the actual light inputted into the OES in the plasma process to calibrate the OES. Thus, the OES may be calibrated without disassembling of the OES from the plasma chamber. Accordingly, a decrease in a time for calibrating the OES may be achieved. Further, because transferring the OES may not be required, the OES may not be contaminated.

The foregoing is illustrative of some example embodiments and is not to be construed as limiting thereof. Although a few example embodiments have been described, those of ordinary skill in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A calibrator of an optical emission spectroscopy (OES), the calibrator comprising:
a cover configured to be detachably combined with a ceiling of a plasma chamber;
a reference light source at on an outer surface of the cover to be positioned outside the plasma chamber, the reference light source configured to irradiate a reference light to the OES through the plasma chamber; and a controller configured to calibrate the OES by comparing a spectrum of the reference light incident to the OES with a spectrum of an actual light incident to the OES during a plasma process performed in the plasma chamber.

2. The calibrator of claim 1, further comprising:
a mirror under the cover, the mirror slanted with respect to a vertical direction, the mirror configured to reflect the reference light incident to the plasma chamber in the vertical direction toward a viewport at a sidewall of the plasma chamber.

3. The calibrator of claim 2, wherein the mirror includes,
an upper end positioned higher than an electrostatic chuck (ESC) in the plasma chamber, and
a lower end positioned lower than the ESC.

4. The calibrator of claim 2, further comprising:
a diffuser configured to diffuse the reference light that has been reflected.

5. The calibrator of claim 4, further comprising:
a collimator configured to induce the reference light diffused by the diffuser in a horizontal direction.

6. The calibrator of claim 4, further comprising:
a lens configured to concentrate the reference light diffused by the diffuser.

7. The calibrator of claim 1, wherein the cover includes at least two first pin holes, the at least two first pin holes configured to receive at least two pins installed at an upper end of the plasma chamber.

8. The calibrator of claim 7, wherein the first pin holes are collinear and are on a diameter of the cover.

9. The calibrator of claim 8, wherein the cover further includes at least two second pin holes inside the first pin holes, the at least two second pin holes are collinear and are on the diameter of the cover.

10. The calibrator of claim 1, wherein a color on a face of the cover is black, and the cover is configured to form a darkroom in the plasma chamber.

11. The calibrator of claim 1, wherein the reference light source is configured to be fixed to the outer surface of the cover by a cover bracket arranged on a side surface of the reference light source.

12. The calibrator of claim 1, wherein the reference light source is configured to be inserted into an optical hole of the cover using a light source bracket that surrounds the optical hole of the cover, and wherein
a body tube extends from a lower end of the optical hole into the plasma chamber to guide reference light from the reference light source into the plasma chamber in a vertical direction.

13. A calibrator of an optical emission spectroscopy (OES), the calibrator comprising:
a cover configured to be attached and detached with a ceiling of a plasma chamber;
a reference light source on an outer surface of the cover to be positioned outside the plasma chamber, the reference light source configured to irradiate a reference light to the OES through the plasma chamber;
a mirror under the cover, the mirror slanted with respect to a vertical direction, the mirror configured to reflect the reference light incident to the plasma chamber in the vertical direction toward a viewport, the viewport being at a sidewall of the plasma chamber;
a diffuser configured to diffuse the reference light reflected from the mirror;
a collimator configured to induce the reference light diffused by the diffuser in a horizontal direction; and
a controller configured to calibrate the OES by comparing a spectrum of the reference light incident to the OES through the collimator with a spectrum of an actual light incident to the OES during a plasma process performed in the plasma chamber.

14. The calibrator of claim 13, wherein the mirror includes,
an upper end configured to be positioned higher than an electrostatic chuck (ESC) in the plasma chamber, and
a lower end configured to be positioned lower than the ESC.

15. The calibrator of claim 13, wherein the cover includes,
at least two first pin holes configured to receive at least two pins, the at least two pins installed at an upper end of the plasma chamber.

16. The calibrator of claim 15, wherein the first pin holes are collinear and are on a diameter of the cover.

17. A calibrator of an optical emission spectroscopy (OES), the calibrator comprising:
a cover configured to be detached and attached with a ceiling of a plasma chamber;
a reference light source on an outer surface of the cover to be positioned outside the plasma chamber, the reference light source configured to irradiate a reference light to the OES through the plasma chamber;
a mirror under the cover, the mirror slanted with respect to a vertical direction, the mirror configured to reflect the reference light incident to the plasma chamber in the vertical direction toward a viewport located at a sidewall of the plasma chamber;
a diffuser configured to diffuse the reference light reflected from the mirror toward the viewport;
a lens configured to concentrate the reference light diffused by the diffuser; and
a controller configured to calibrate the OES by comparing a spectrum of the reference light incident to the OES through the lens with a spectrum of an actual light incident to the OES during a plasma process performed in the plasma chamber.

18. The calibrator of claim 17, wherein the mirror includes,
an upper end configured to be higher than an electrostatic chuck (ESC) in the plasma chamber, and
a lower end configured to be lower than the ESC.

19. The calibrator of claim 17, wherein the cover comprises,
at least two first pin holes configured to receive at least two pins, the at least two pins installed at an upper end of the plasma chamber.

20. The calibrator of claim 19, wherein the first pin holes are collinear and are on a diameter of the cover.

* * * * *